(12) United States Patent
Hasuo et al.

(10) Patent No.: US 10,284,062 B2
(45) Date of Patent: May 7, 2019

(54) METHOD FOR MANUFACTURING WORKPIECE AND METHOD FOR MANUFACTURING LAMINATED CORE

(71) Applicant: Mitsui High-tec, Inc., Yahatanishi-ku, Kitakyushu-shi (JP)

(72) Inventors: Yusuke Hasuo, Kitakyushu (JP); Masahiro Izumi, Kitakyushu (JP)

(73) Assignee: MITSUI HIGH-TEC, INC., Kitakyushu-Shi, Fukuoka (JP)

(*) Notice: Subject to any disclaimer, the term of this patent is extended or adjusted under 35 U.S.C. 154(b) by 205 days.

(21) Appl. No.: 15/151,853

(22) Filed: May 11, 2016

(65) Prior Publication Data
US 2016/0336840 A1   Nov. 17, 2016

(30) Foreign Application Priority Data
May 12, 2015   (JP) ................. 2015-097222

(51) Int. Cl.
| | | |
|---|---|---|
| *H01F 7/04* | (2006.01) | |
| *H02K 15/03* | (2006.01) | |
| *H02K 15/02* | (2006.01) | |
| *B21D 35/00* | (2006.01) | |

(52) U.S. Cl.
CPC .......... *H02K 15/03* (2013.01); *B21D 35/001* (2013.01); *H02K 15/022* (2013.01); *H02K 15/024* (2013.01); *Y10T 29/49078* (2015.01)

(58) Field of Classification Search
CPC ......... Y10T 29/49009; Y10T 29/49012; Y10T 29/49078; Y10T 29/53143; Y10T 29/5317; Y10T 156/1322; Y10T 156/1761; Y10T 29/49069; Y10T 83/04; Y10T 83/0529; H02K 2201/09; H02K 15/02; B21D 45/003

USPC .... 29/609, 596, 598, 605, 606, 604; 310/71, 310/216.004, 216.011, 216.059, 216.1
See application file for complete search history.

(56) References Cited

U.S. PATENT DOCUMENTS 8,205,320 B2 *  6/2012  Akita ............... H02K 1/148
                                                29/596
2010/0052463 A1   3/2010  Saito et al.
2012/0056503 A1   3/2012  Confalonieri

FOREIGN PATENT DOCUMENTS

| JP | 2000-201457 A | 7/2000 |
|---|---|---|
| JP | 2005-318763 | 11/2005 |

(Continued)

OTHER PUBLICATIONS

Extended European Search Report for EP App No. 16168309.9 dated Oct. 12, 2016, 9 pgs.

*Primary Examiner* — Thiem D Phan
(74) *Attorney, Agent, or Firm* — Procopio, Cory, Hargreaves & Savitch LLP

(57) ABSTRACT

This disclosure relates to a method for manufacturing a workpiece for a segmented laminated core. This method includes (A) feeding a plate for processing drawn from a roll thereof to a progressive die and (B) stamping out a workpiece in the progressive die, the workpiece including a plurality of pieces aligned in the circumferential direction with a circumferential part. At the step (B), an overall portion configured to be each piece of the workpiece is displaced in the thickness direction of the plate for processing, with portions on both sides of the piece being fixed, to form at least one cutting line across a region configured to be the circumferential part.

8 Claims, 15 Drawing Sheets

(56) References Cited

FOREIGN PATENT DOCUMENTS

| JP | 2005-318764 A | 11/2005 |
| JP | 2012-005155 A | 1/2012 |

* cited by examiner

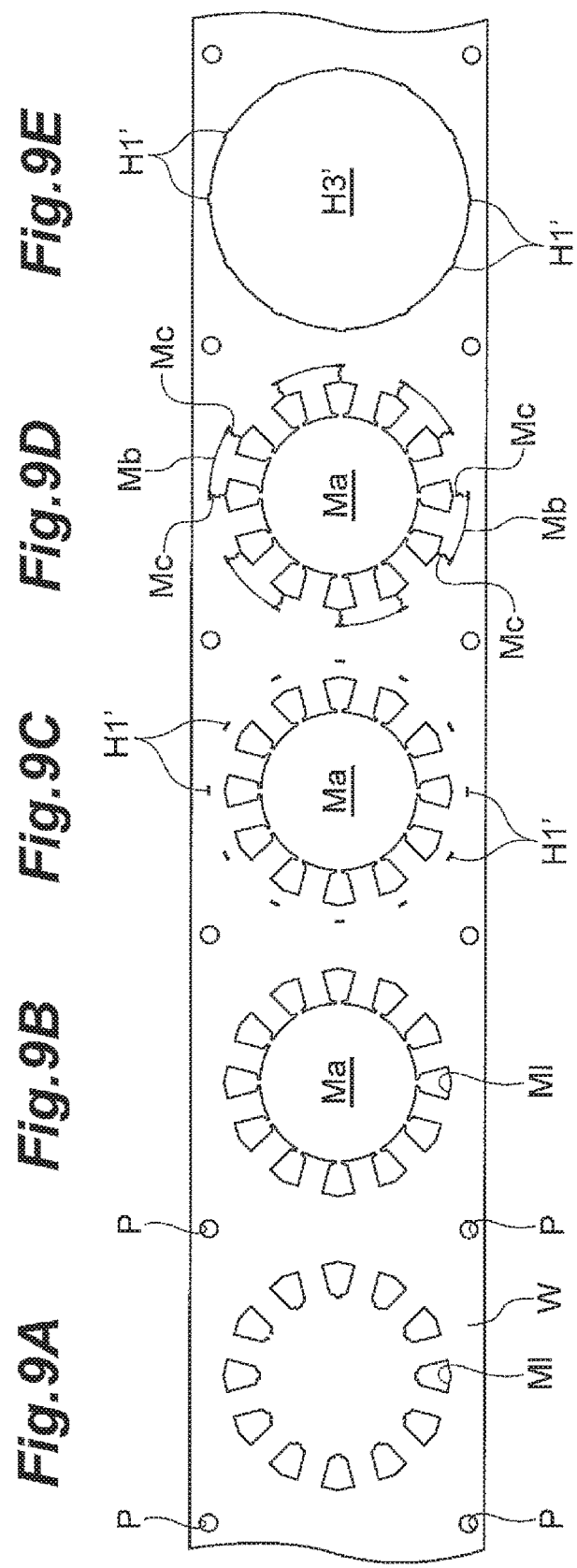

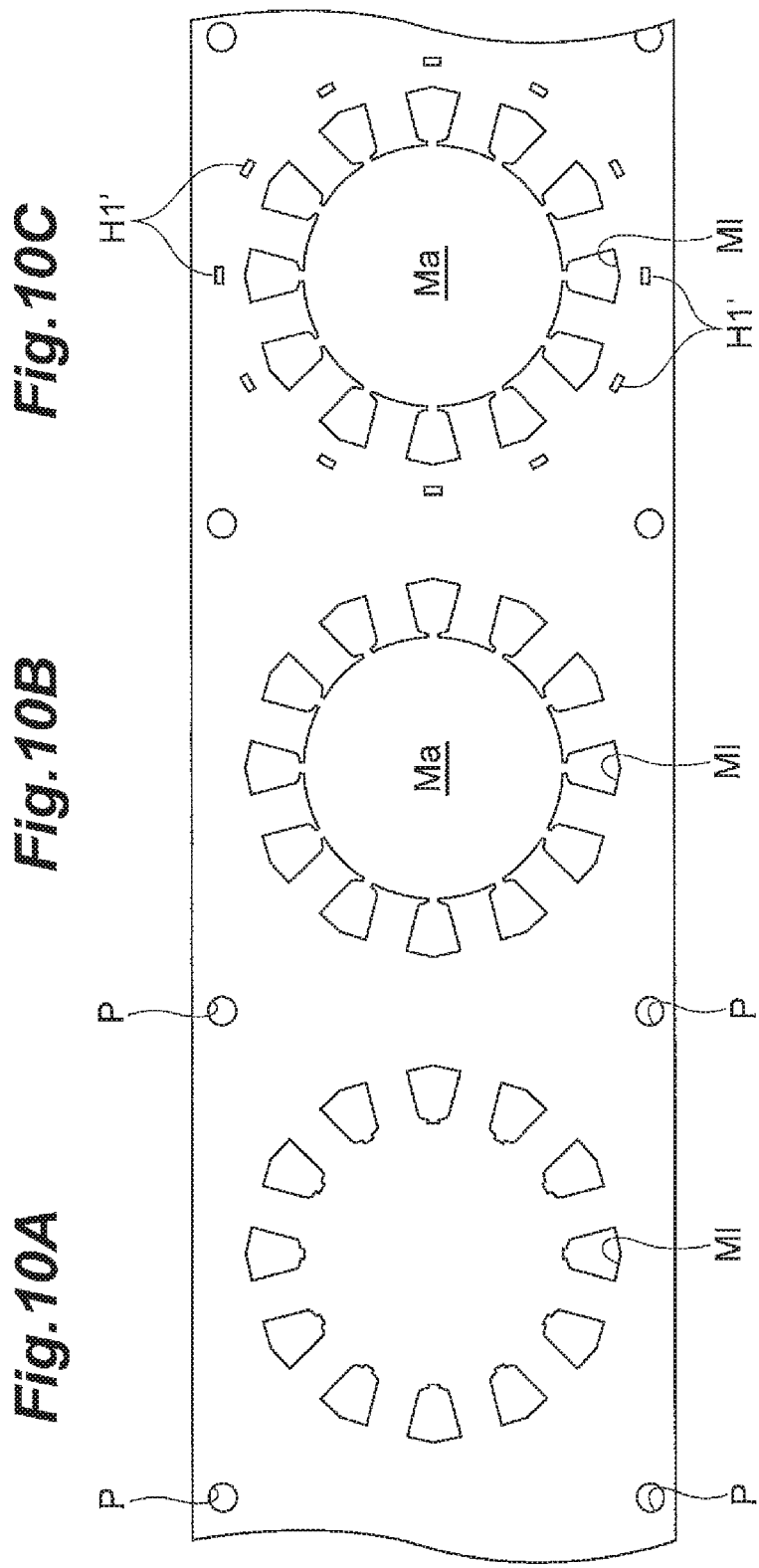

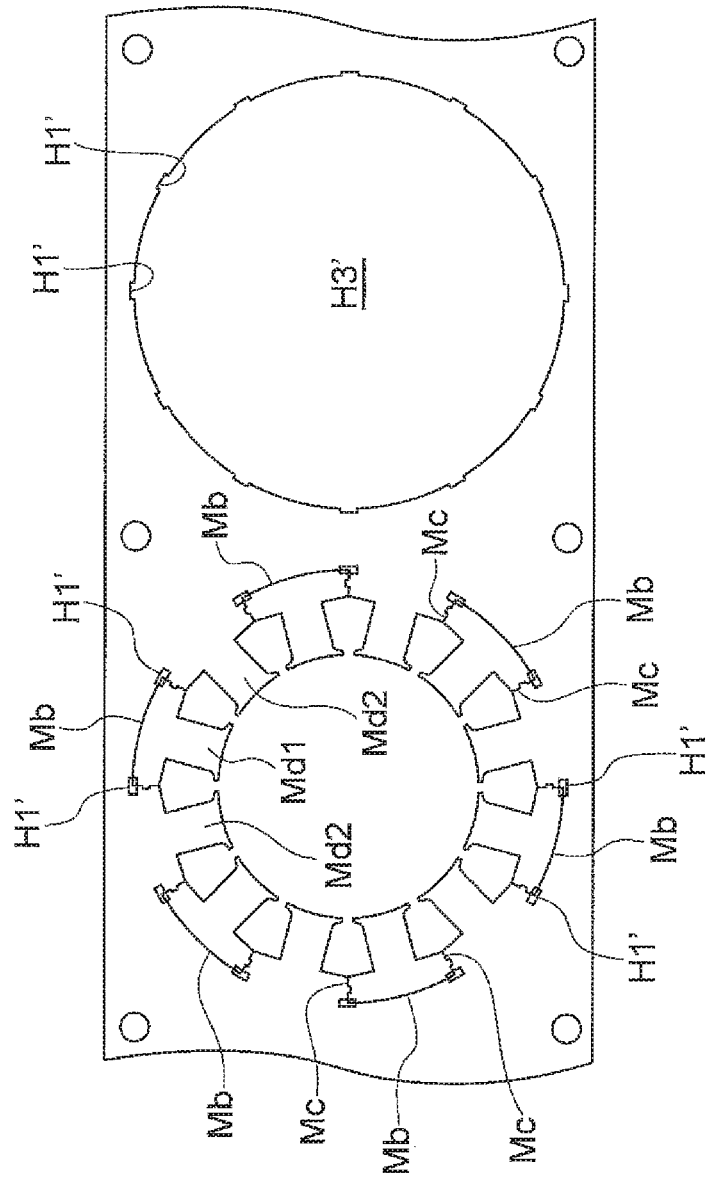

METHOD FOR MANUFACTURING WORKPIECE AND METHOD FOR MANUFACTURING LAMINATED CORE

CROSS-REFERENCE TO RELATED APPLICATION

This application is based upon and claims the benefit of priority from Japanese Patent Application No. 2015-097222, filed May 12, 2015, the entire contents of which are incorporated herein by reference.

BACKGROUND

1. Field

This disclosure relates to a method for manufacturing a workpiece for a laminated core and a method for manufacturing a laminated core.

A laminated core is a component of a motor. The laminated core is formed by stacking a plurality of magnetic steel sheets (workpieces) each of which is processed in a predetermined shape and fastening the sheets together. The motor includes a rotor and a stator each of which contains a laminated core, and is produced through a step of winding a coil on the stator and a step of attaching a shaft to the rotor, for example. Motors incorporating laminated cores have been conventionally used as driving sources for refrigerators, air conditioners, hard disc drives, and electric tools, for example, and are also used as driving sources for hybrid cars these days.

2. Related Background Art

Japanese Patent No. 4472417 discloses a method for manufacturing a segmented laminated core. Referring to FIG. 7 and FIG. 8 in Japanese Patent No. 4472417, slit lines L are formed by cutting-and-bending processing and pushback (see paragraphs [0028] to [0032] in Japanese Patent No. 4472417).

SUMMARY

This disclosure relates to a method for manufacturing a segmented workpiece. This manufacturing method includes (A) feeding a plate for processing drawn from a roll thereof to a progressive die and (B) stamping out a workpiece in the progressive die, the workpiece including a plurality of pieces aligned in the circumferential direction with a circumferential part. At the above-described step (B), an overall portion configured to be each piece of the workpiece is displaced in a thickness direction of the plate for processing, with portions on both sides of the piece being fixed, to form at least one cutting line across a region configured to be the circumferential part.

BRIEF DESCRIPTION OF THE DRAWINGS

FIGS. 9A to 9E are plan views for illustrating an overall strip layout for forming cutting lines by stamping;

FIGS. 10A to 10C are enlarged plan views of FIGS. 9A to 9C (the first half of the strip layout), respectively;

FIGS. 11A and 11B are enlarged plan views of FIGS. 9D and 9E (the latter half of the strip layout), respectively;

DETAILED DESCRIPTION

Figure 1:
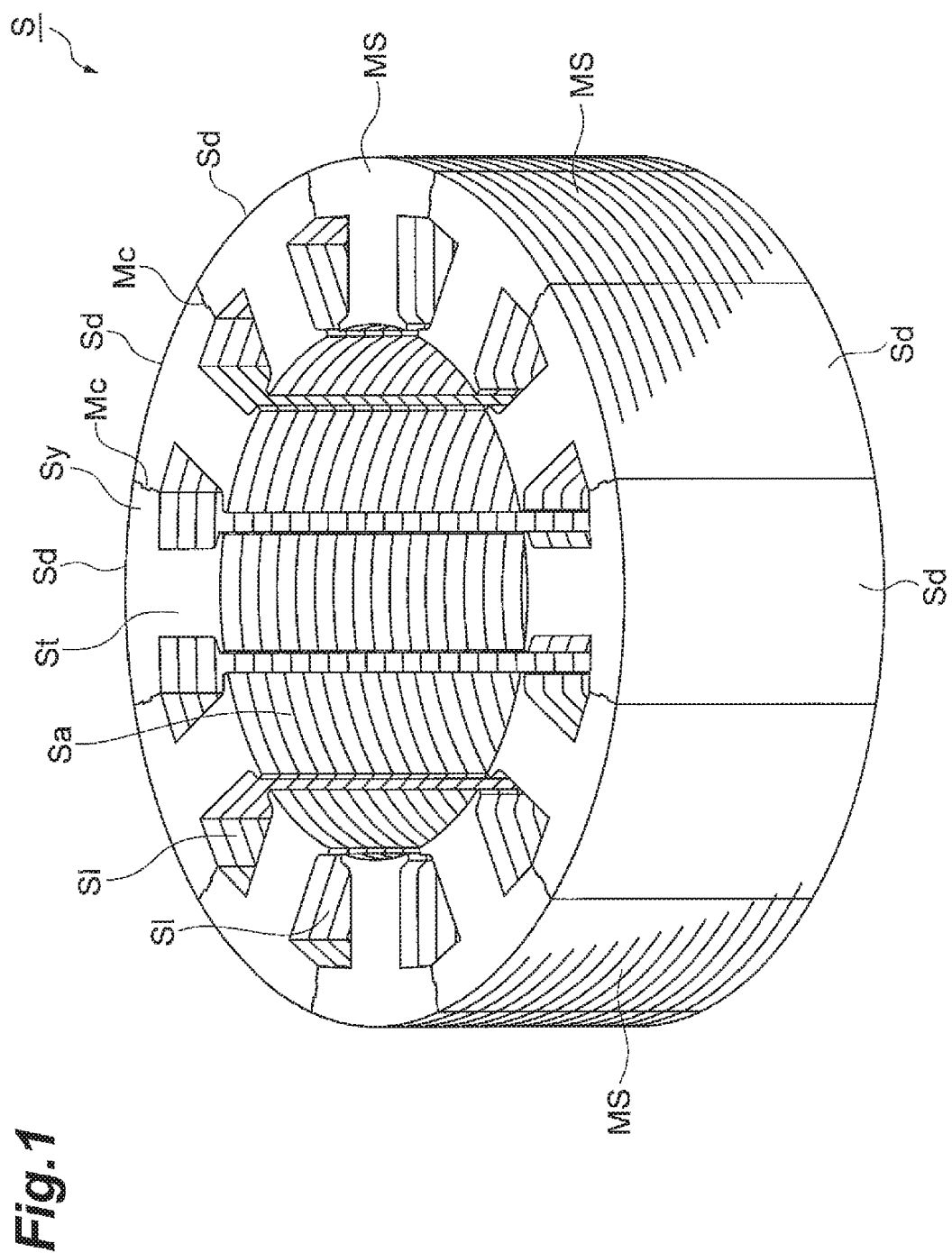
FIG. 1 is a perspective view of one example of a segmented laminated core for a stator.

Hereinafter, a plurality of embodiments of the present invention will be described with reference to the accompanying drawings. In the description of the drawings, the same elements will be designated by the same reference numerals and a duplicate description thereof will be omitted. The drawings and the related technologies are provided in order to describe the embodiments of the present invention, and do not limit the scope of the present invention.

<Laminated Core and Workpiece>

FIG. 1 is a perspective view of a segmented laminated core S constituting a stator. The shape of the laminated core S is substantially cylindrical, and an opening Sa positioned in its central part is used for arranging a rotor (not depicted). A plurality of workpieces MS constitute the laminated core S. The laminated core S has a circumferential yoke part Sy and tooth parts St extending from the inner periphery of the yoke part Sy toward the center. Depending on the usage and performance of the motor, the width of the yoke part Sy is about 2 to 40 millimeters. The laminated core S includes a total of 12 core pieces Sd each having one tooth part St. Thus, the laminated core S has 12 tooth parts St in total. Spaces called "slots" (hereinafter referred to as "slots Sl") are formed between adjacent tooth parts St.

Figure 2:
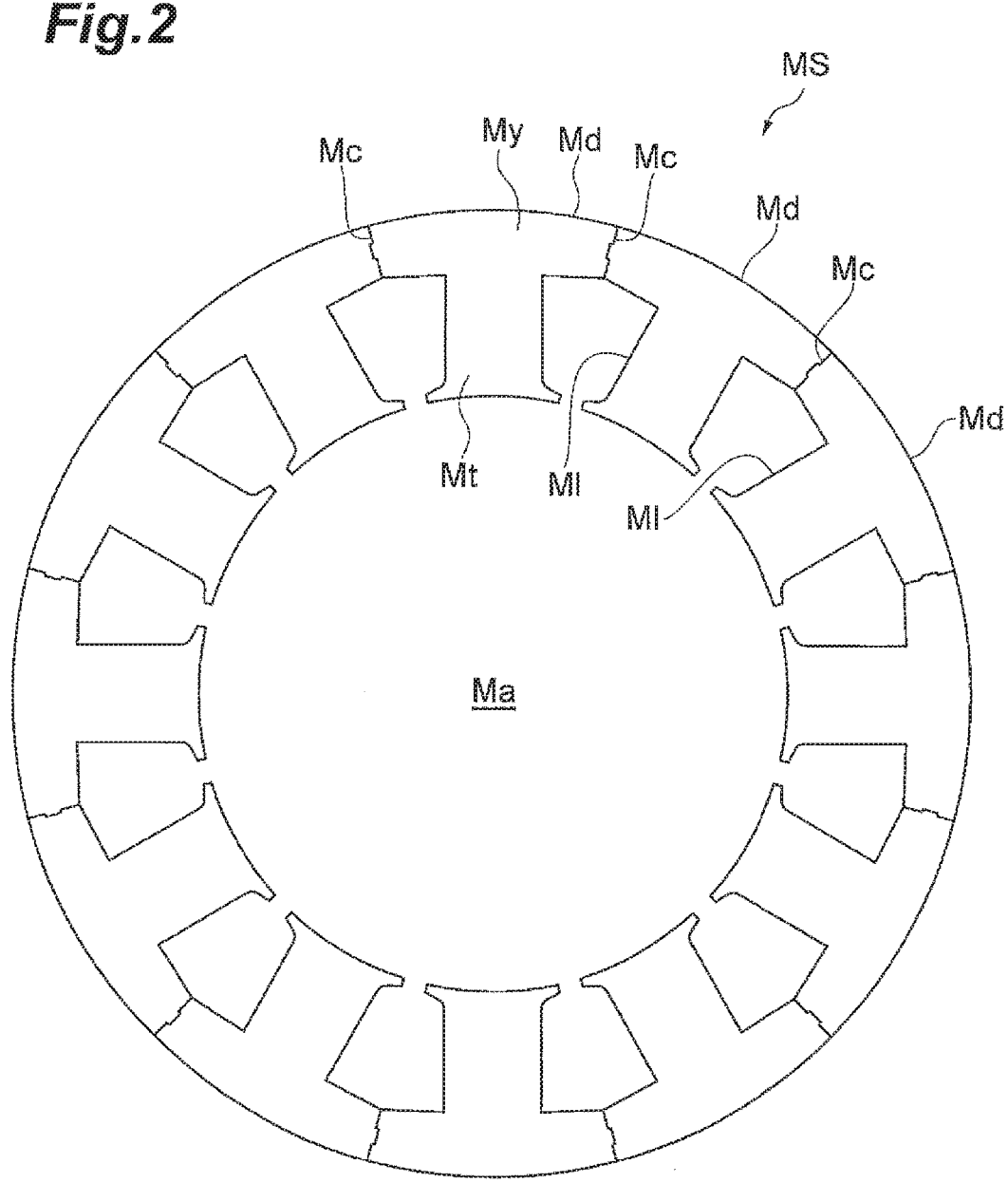
FIG. 2 is a plan view of a segmented workpiece constituting the laminated core depicted in FIG. 1.

The laminated core S is produced by stacking the workpieces MS one of which is depicted in FIG. 2 and fastening the workpieces together. Any method for fastening the workpieces MS together is applicable. For example, the workpieces may be fastened to each other by swaging, welding, adhesive, or a resin material. Conventionally, swaging and welding have been widely used in view of cost and work efficiency. Alternatively, when higher priorities are given to greater torque and lower iron loss of a motor, instead of swaging or welding, a resin material or adhesive may be used. The laminated core S may be obtained by disposing a temporarily-interlocking portion to fasten the workpieces MS to each other, and finally removing the temporarily-interlocking portion from the laminate. The "temporarily-interlocking portion" is a swaged portion used for temporarily integrating a plurality of workpieces produced by stamping, and then removed in a process of producing a product (laminated core).

When the temporarily-interlocking portion is not disposed on the workpieces MS, the shape of each workpiece MS in plan view is the same as that of the laminated core S, as depicted in FIG. 2. The workpiece MS includes a through hole Ma constituting the opening Sa, a circumferential part My constituting the yoke part Sy, and protruding parts Mt constituting the tooth parts St. The workpiece MS includes a total of 12 pieces Md each having one protruding part Mt. Thus, the workpiece has 12 protruding parts Mt in total. Slot holes Ml constituting the slots Sl are formed between adjacent protruding parts Mt.

The circumferential part My of the workpiece MS has a plurality of cutting lines Mc formed across the circumferential part My. Each cutting line Mc is formed so that a projection will fit into a depression. The shape of the cutting line Mc is not limited to the shape having the depression and the projection as depicted in FIGS. 1 and 2 and may be a linear shape (that may tilt with respect to the radial direction), a curved shape, or a combination thereof.

<Stamping Device>

Figure 3:
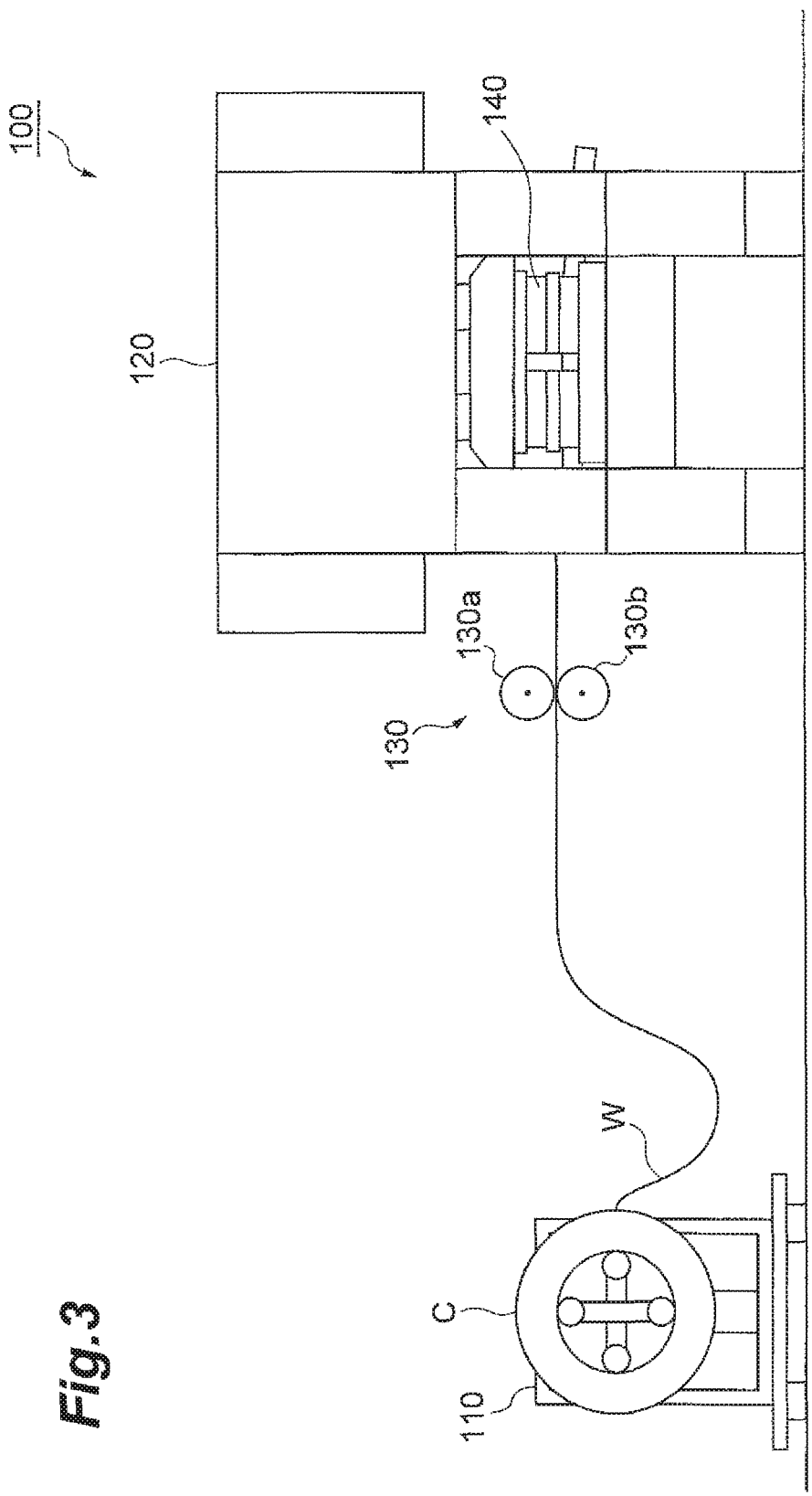
FIG. 3 is a schematic diagram illustrating one example of a stamping device.

FIG. 3 is a schematic diagram illustrating one example of a stamping device for producing the workpieces MS constituting the laminated core S by stamping. The stamping device 100 depicted in FIG. 3 includes an uncoiler 110 on which a roll C is mounted, a feeder 130 configured to feed a magnetic steel sheet (hereinafter referred to as "sheet W") drawn from the roll C, a progressive die 140 configured to perform stamping on the sheet W, and a press machine 120 configured to cause the progressive die 140 to operate.

The uncoiler 110 rotatably holds the roll C. The length of the magnetic steel sheet constituting the roll C is 500 to 10,000 meters, for example. The thickness of the magnetic steel sheet constituting the roll C may be about 0.1 to 0.5 millimeter, or may be about 0.1 to 0.3 millimeter from a viewpoint of achieving more excellent magnetic properties of the laminated core S. The width of the magnetic steel sheet (sheet W) may be about 50 to 500 millimeters.

The feeder 130 has a pair of rollers 130a and 130b that sandwich the sheet W from above and below. The sheet W is fed into the progressive die 140 via the feeder 130. The progressive die 140 is a device configured to serially perform stamping, cutting-and-bending processing, and pushback, for example, on the sheet W.

<Method for Manufacturing Laminated Core>

A method for manufacturing the laminated core S will be described next. The laminated core S is produced through a process of producing the workpieces MS (steps (A) and (B) below) and a process of producing the laminated core S from the workpieces MS (step (C) below). More specifically, the method for manufacturing the laminated core S includes the following steps:

(A) feeding the sheet W drawn from the roll C to the progressive die 140;

(B) stamping out the workpiece MS in the progressive die 140, the workpiece MS including the pieces Md aligned in the circumferential direction with the circumferential part My; and (C) stacking more than one of the workpieces MS and fastening the workpieces MS together to obtain the laminated core S.

To begin with, the roll C of the magnetic steel sheet is prepared, and is mounted on the uncoiler 110. The magnetic steel sheet (sheet W) drawn from the roll C is fed to the progressive die 140 (step (A)).

In the progressive die 140, the workpieces MS are serially produced by performing stamping on the sheet W (step (B)). The step (B) of this embodiment includes, before forming the workpieces MS by stamping out the workpieces MS at the outer circumferences, the following steps in this order:

(b-1) forming an inner opening (through hole Ma and slot holes Ml) radially inside the circumferential part My;

(b-2) forming the cutting lines Mc across a region configured to be the circumferential part My; and (b-3) returning a piece Md1 having been displaced in the thickness direction of the sheet W to an original position.

Figure 4:
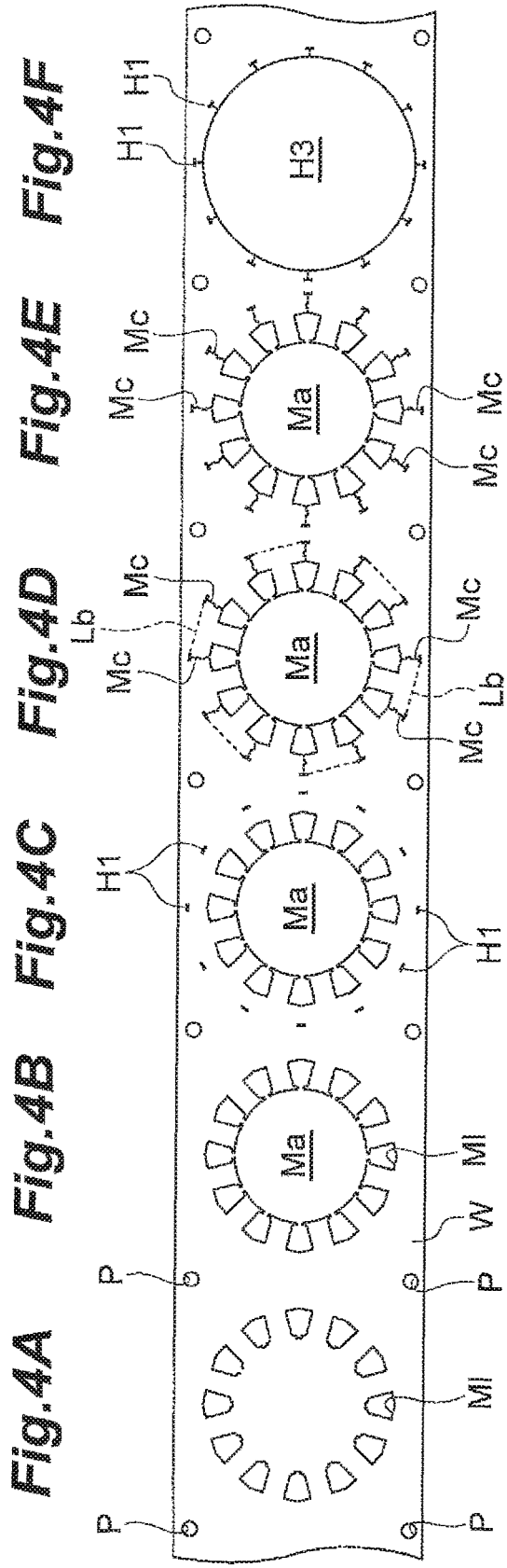
FIGS. 4A to 4F are plan views for illustrating an overall strip layout for forming cutting lines by cutting-and-bending processing.
Figure 5:
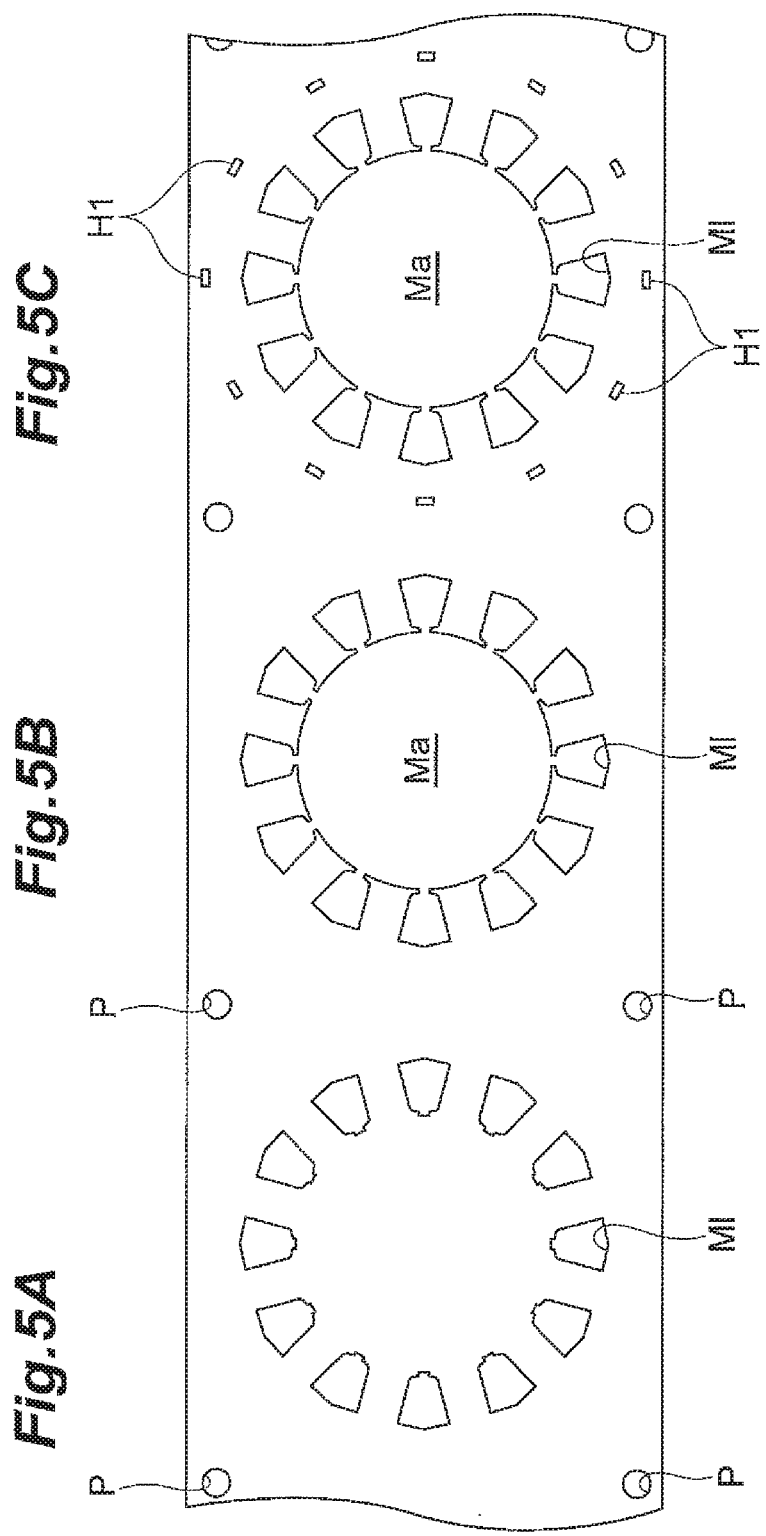
FIGS. 5A to 5C are enlarged plan views of FIGS. 4A to 4C (the first half of the strip layout), respectively.

Referring to FIGS. 4A to 4F, FIGS. 5A to 5C, and FIGS. 6A to 6C, the step (B) will be described. FIGS. 4A to 4F are plan views for illustrating an overall strip layout for stamping serially performed by the progressive die 140. FIGS. 4A to 4F are plan views for each illustrating a state of the sheet W after respective steps B1 to B6 described below are performed. FIGS. 5A to 5C are enlarged views of FIGS. 4A to 4C, and FIGS. 6A to 6C are enlarged views of FIGS. 4D to 4F, respectively. The strip layout for stamping is not limited to that depicted in these drawings, and a step for balancing press loads or a step of forming a temporarily-interlocking portion may be added, for example. A step B1, a step B2, and a step B3 below may be performed in any order.

The step B1 is a step of forming a total of 12 slot holes Ml on the sheet W on which pilot holes P have been formed (see FIG. 4A and FIG. 5A). The pilot holes P are holes for positioning the sheet W in the progressive die 140.

The step B2 (step (b-1)) is a step of forming the through hole Ma (see FIG. 4B and FIG. 5B). Performing this step connects the 12 slot holes Ml and the through hole Ma, and forms the inner opening radially inside the circumferential part My.

The step B3 is a step of forming a total of 12 openings H1 at positions corresponding to both ends of bending lines Lb to make it easier to perform cutting-and-bending processing at a next step B4 (see FIG. 4C and FIG. 5C). The openings H1 are formed radially outside the region configured to be the circumferential part My in the radial directions of the slot holes M to prevent lines (bending lines Lb) connecting adjacent two openings H1 from passing through the circumferential part My. The openings H1 may not be necessarily formed, but forming the openings H1 at the above-described positions have the effect of reducing abrasion of a punch used for cutting-and-bending processing.

Figure 7:
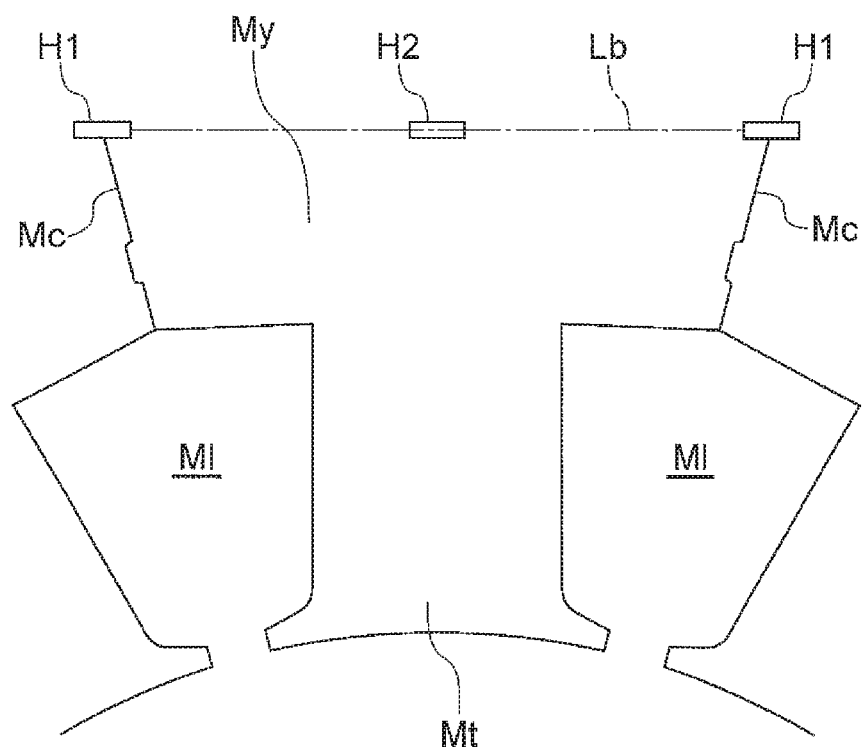
FIG. 7 is a plan view of an opening formed on a bending line.

An opening H2 may be further formed on the line (bending line Lb) connecting two openings H1 at both ends of the bending line Lb as depicted in FIG. 7 to make it further easier to bend the sheet W. When the opening H2 has a shape having the longitudinal direction (rectangular or elliptical shape, for example), the longitudinal direction is preferably aligned with the direction of the bending line Lb. When the openings H1 at both ends of the bending line Lb also have a shape having the longitudinal direction (rectangular or elliptical shape, for example), the longitudinal directions are also preferably aligned with the direction of the bending line Lb (see FIG. 7).

Figure 6:
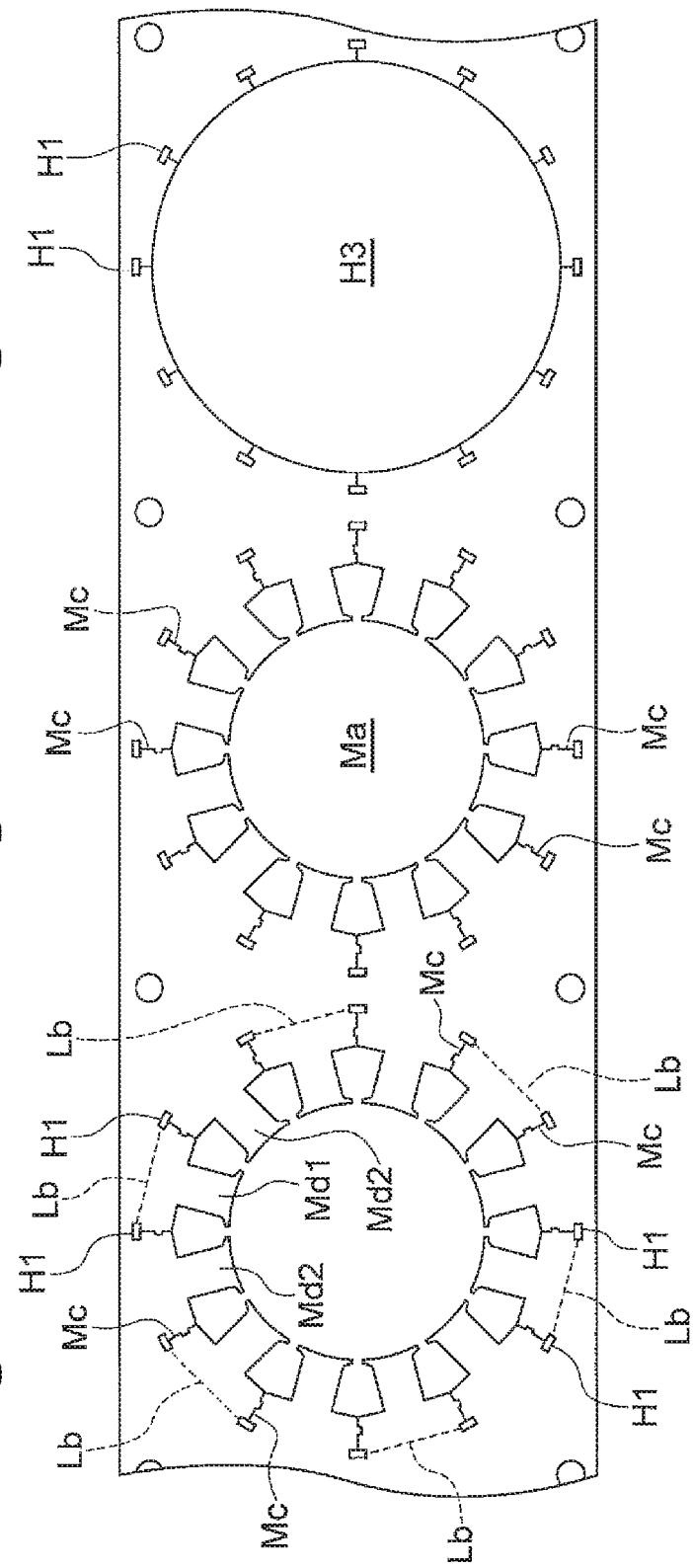
FIGS. 6A to 6C are enlarged plan views of FIGS. 4D to 4F (the latter half of the strip layout), respectively.

The step B4 (step (b-2)) is a step of forming the cutting lines Mc by cutting-and-bending processing (see FIG. 4D and FIG. 6A). At this step, the cutting lines Mc are formed by displacing the overall portion configured to be each piece Md1 of the workpiece MS downward by a punch (not depicted) positioned above. At this time, portions (pieces Md2 and Md2) on both sides of the piece Md1 to be displaced downward are each fixed. Forming the cutting lines Mc in this manner cuts the piece Md1 off from both adjacent portions. As depicted in FIG. 6A, a total of 12 cutting lines Mc can be formed by performing cutting-and-bending processing on a total of 6 every other pieces Md among the total of 12 pieces Md.

Figure 8A:
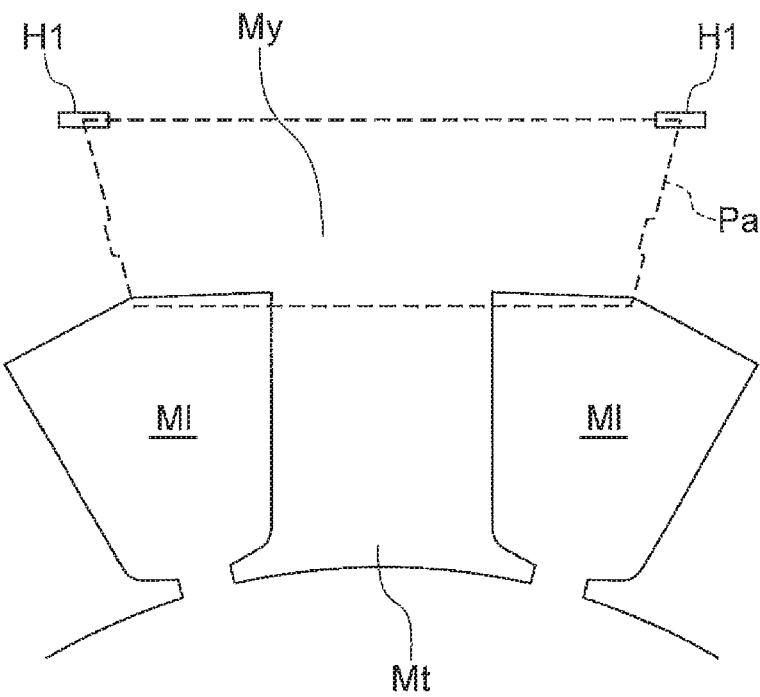
FIG. 8A is a plan view in which a dashed line indicates the shape of a punch configured to contact part of a portion to be displaced in the thickness direction of a plate for processing.
Figure 8B:
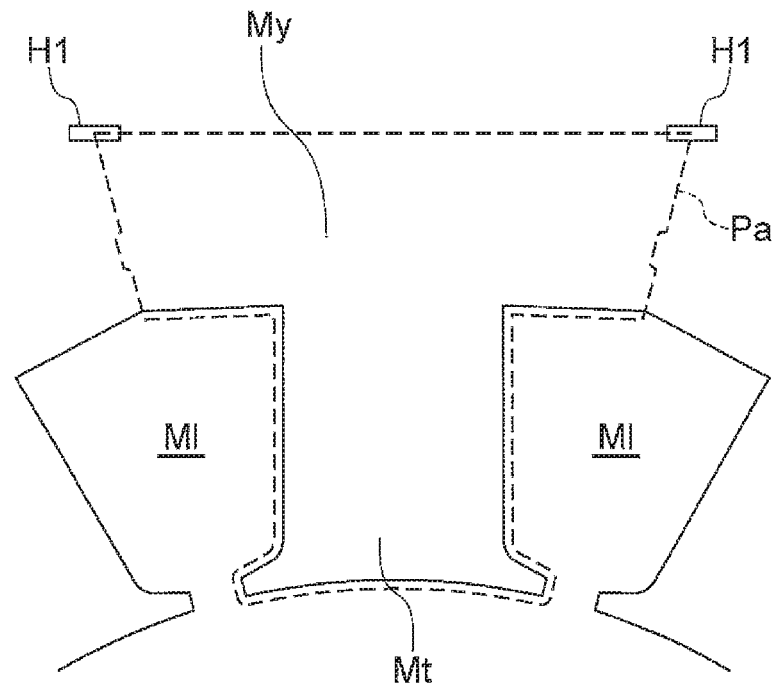
FIG. 8B is a plan view in which a dashed line indicates the shape of a punch configured to contact the overall portion to be displaced in the thickness direction of the plate for processing.

A case has been exemplified here in which the overall portion configured to be each piece Md of the workpiece MS is displaced downward by the punch positioned above, but the overall portion may be displaced upward by a punch positioned below. As long as the overall portion is displaced in the thickness direction of the plate for processing by a punch and the cutting lines Mc can be appropriately formed, an end face Pa of the punch may contact part of the portion (FIG. 8A), or the end face Pa of the punch may contact the overall portion (FIG. 8B). The end face Pa of the punch preferably contacts the overall portion as depicted in FIG. 8B from a viewpoint of unlikelihood of deformations of the piece Md even with an increased moving speed of the punch.

A step B5 (step (b-3)) is a step of returning the piece Md having been displaced in the thickness direction of the sheet W to the original position (see FIG. 4E and FIG. 6B). This step can be performed by push-back.

A step B6 is a step of stamping out the workpiece MS at the outer circumference (step of forming an opening H3) (see FIG. 4F and FIG. 6C). The opening H3 is positioned radially inside the bending lines Lb. Thus, the region on which the bending lines Lb are formed can be excluded from the workpiece MS by performing stamping at the outer circumference of the workpiece MS (circumferential part My). In this manner, the workpiece MS sufficiently little affected by effects such as a deformation associated with the formation of the cutting lines Mc can be obtained.

A predetermined number of the workpieces MS (FIG. 2) obtained through the above-described steps B1 to B6 are stacked together, and these workpieces MS are fastened together to give the laminated core S (step (C)). Any method for fastening the workpieces MS together is applicable. As described above, methods such as swaging, welding, adhesive, a resin material, and combinations thereof may be used as appropriate.

In the foregoing, one embodiment of this disclosure has been described, but the present invention is not limited to the above-described embodiment. In the above-described embodiment, a case has been exemplified in which the cutting lines Mc are formed by cutting-and-bending processing, but the cutting lines Mc may be formed by stamping, for example. Referring to FIGS. 9A to 9E, FIGS. 10A to 10C, and FIGS. 11A and 11B, the step (B) of forming the cutting lines Mc by stamping will be described. FIGS. 9A to 9E are plan views for illustrating an overall strip layout for stamping serially performed by the progressive die 140. FIGS. 9A to 9E are plan views for each illustrating a state of the sheet W after respective steps B1' to B5' described below are performed. FIGS. 10A to 10C are enlarged views of FIGS. 9A to 9C, and FIGS. 11A and 11B are enlarged views of FIGS. 9D and 9E, respectively. The strip layout for stamping is not limited to that depicted in these drawings. The step B1', the step B2', and the step B3' below may be performed in any order.

The step B1' (step (b-1)) is the same step as the above-described step B1: a step of forming the total of 12 slot holes Ml on the sheet W on which the pilot holes P have been formed (see FIG. 9A and FIG. 10A).

The step B2' is the same step as the above-described step B2: a step of forming the through hole Ma for the circumferential part My (see FIG. 9B and FIG. 10B).

The step B3' is a step of forming a total of 12 openings H1' at positions corresponding to the outer circumference of the workpiece MS (circumferential edge of the opening H3) radially outside the slot holes Ml to make it easier to perform stamping at the next step (step B4) (see FIG. 9C and FIG. 10C).

The step B4' is a step of forming the cutting lines Mc by stamping and returning by push-back the stamped-out piece Md to the original position (step (b-2) and step (b-3)). At this step, the cutting lines Mc are formed by stamping out the overall portion configured to be the piece Md1 of the workpiece MS by a punch (not depicted). At this time, portions (pieces Md2 and Md2) on both sides of the piece Md1 to be displaced downward are each fixed. Forming the cutting lines Mc in this manner cuts the piece Md1 off from both adjacent portions. As depicted in FIG. 9D and FIG. 11A, a total of 12 cutting lines Mc can be formed by performing stamping on a total of 6 every other pieces Md among the total of 12 pieces Md. Performing this step also forms six cutting lines Mb constituting part of the outer circumference of the workpiece MS.

The step B5' is a step of stamping out the workpiece MS at the outer circumference (step of forming an opening H3') (see FIG. 9E and FIG. 11B). This step cuts the portions of the outer circumference of the workpiece MS on which the cutting lines Mb are not formed at the above-described step B4'. Accordingly, the opening H3' is formed. Also in this manner, the workpiece MS sufficiently little affected by effects such as a deformation associated with the formation of the cutting lines Mc can be obtained as in the above-described embodiment.

Figure 12:
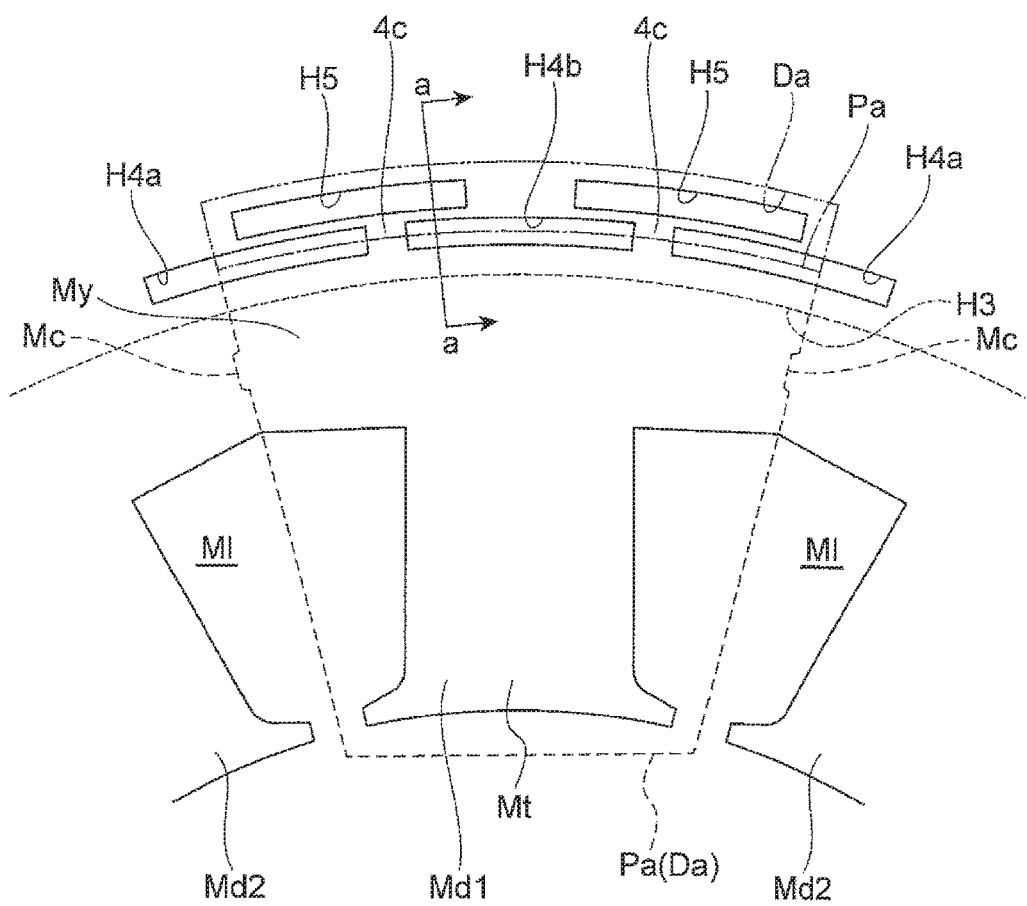
FIG. 12 is a plan view for illustrating another example in which cutting lines are formed by stamping.
Figure 13A:
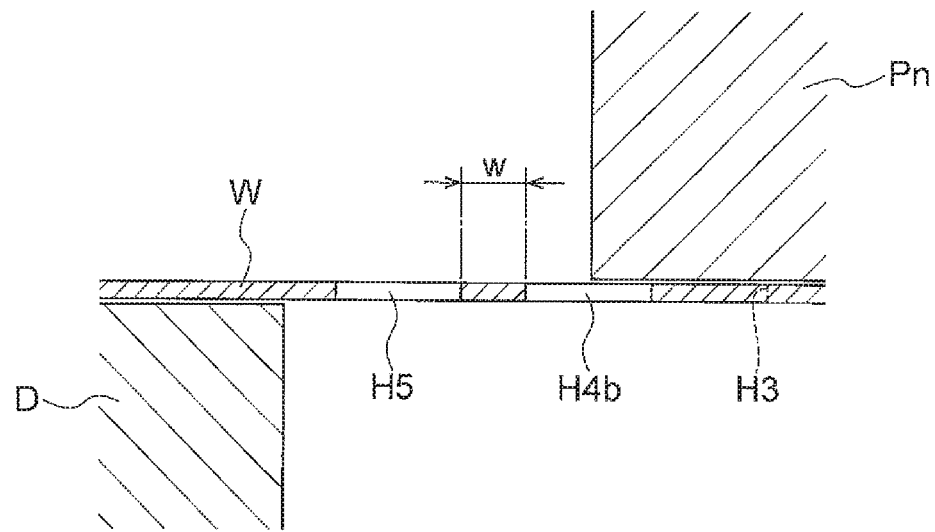
FIG. 13A is a sectional view for illustrating a state before forming the cutting lines by stamping.
Figure 13B:
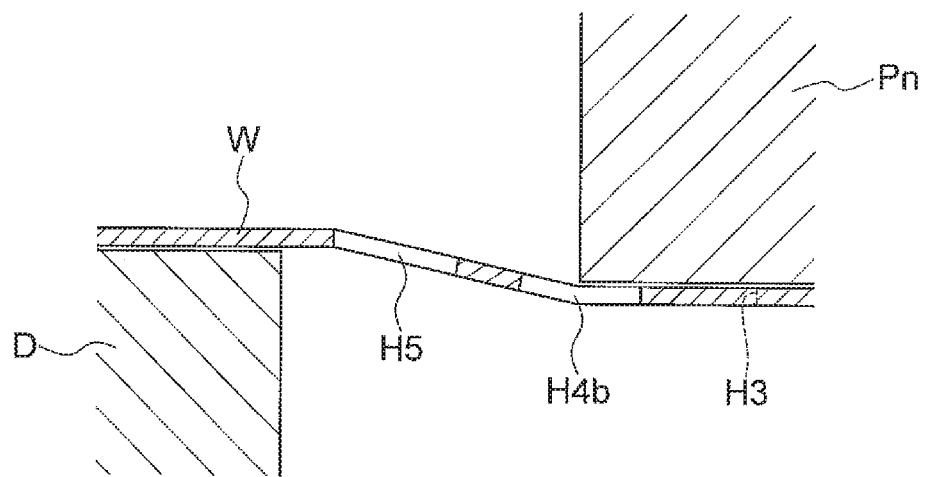
FIG. 13B is a sectional view for illustrating a state after forming the cutting lines by a descent of a die.

In the embodiment depicted in FIGS. 9A to 9E, FIGS. 10A to 10C, and FIGS. 11A and 11B, a case has been exemplified in which the cutting lines Mb and the cutting lines Mc are formed by stamping followed by push-back, but only the cutting lines Mc may be formed by stamping followed by push-back. Referring to FIG. 12, FIG. 13A, and FIG. 13B, its specific example will be described. FIG. 12 is a plan view for illustrating a state of the sheet W before the cutting lines Mc are formed by stamping. In the state depicted in FIG. 12, a pair of openings H4a and H4a, an opening H4b positioned therebetween, and two openings H5 and H5 radially outside these openings have been further formed on the sheet W depicted in FIG. 4B. FIG. 13A is a sectional view (sectional view along the line a-a depicted in FIG. 12) for illustrating a state before forming the cutting lines Mc by stamping, and FIG. 13B is a sectional view for illustrating a state after forming the cutting lines Mc by stamping by a descent of a punch Pn. After the state depicted in FIG. 13B, the stamped-out portion (portion configured to be the piece Md1) is returned by push-back to the original position.

In FIG. 12, the shape indicated by a long dashed line and a dot-and-dash line is the shape of the end face Pa of the punch Pn. In FIG. 12, the shape indicated by the long dashed line and a dash-dot-dot line is the shape of an opening Da of a die D. Displacing the punch Pn downward (see FIG. 13B) forms the respective cutting lines Mc between the portion configured to be the piece Md1 and portions (portions configured to be the pieces Md2 and Md2) on both sides. The two cutting lines Mc are formed across the region configured to be the circumferential part My. In FIG. 12, a short dashed line indicates the position of the outer circumference (opening H3) of the workpiece MS.

The openings H4a, H4b, and H5 depicted in FIG. 12 are intended to reduce the strength of the region radially outside the region configured to be the workpiece MS. The region of low strength is formed radially outside the region configured to be the workpiece MS, so that the region of low strength stretches as depicted in FIG. 13B when stamping is performed by the punch Pn. This stretching can sufficiently reduce the effect of stamping remaining in the workpiece MS. In addition, since the piece Md1 is not entirely stamped out by stamping but the portion configured to be the piece Md1 is connected to the rest of the sheet W via the region of low strength, push-back can be more stably and reliably performed. Furthermore, the end face Pa of the punch Pn may be a surface orthogonal to the moving direction of the punch Pn in stamping, while cutting-and-bending processing requires the end face of the punch to be a tilted surface, for example.

As depicted in FIG. 12, the pair of openings H4a and H4a and the opening H4b therebetween are formed along the outer circumference of the workpiece MS radially outside the region configured to be the workpiece MS. The positions of these openings H4a, H4a, and H4b are preferably aligned with part of the outer circumference (dot-and-dash line in FIG. 12) of the end face Pa of the punch Pn. The pair of openings H4a and H4a are formed at positions corresponding to corners of the end face Pa of the punch. Forming the openings H4a at these positions can reduce abrasion of the punch Pn used for stamping. The opening H4b is formed between the pair of openings H4a and H4a. Portions 4c between the openings H4a and the opening H4b preferably have sufficient strength to keep from breaking during stamping. Equal to or more than two openings H4b may be formed between the pair of openings H4a and H4a.

The two openings H5 and H5 are formed along the openings H4a, H4a, and H4b radially outside the openings H4a, H4a, and H4b and radially inside the outer circumference (portion of the dash-dot-dot line depicted in FIG. 12 extending along the circumferential direction) of the opening Da of the die D. The openings H5 extend from points positioned radially outside the portions 4c between the openings H4a and the opening H4b toward both circumferential directions (right and left directions in FIG. 12). Forming the openings H5 at such positions results in "T-shaped" portions on the sheet W formed by the openings H5, the openings H4a, and the opening H4b (see FIG. 12). The distance (width w in FIG. 13A) between the openings H5 and the opening H4b (or the openings H4a) may be about 1 to 5 times as large as the thickness of the sheet W. When the width w is equal to or larger than the thickness of the sheet W, breaking of the portion during stamping is sufficiently prevented. When the width w is equal to or less than 5 times larger than the thickness, the portion preferentially deforms during stamping, thereby sufficiently reducing the effect of stamping remaining in the workpiece MS. The number of the openings H5 is not limited to two but may be equal to or more than three. The positions of the openings H5 in the radial direction may be aligned with the position of the outer circumference of the opening Da of the die D.

Also in the above-described embodiments, the overall portion configured to be the piece Md1 is displaced in the thickness direction of the sheet W, with portions configured to be pieces Md on both sides of the piece Md1 being fixed, to form the two cutting lines Mc.

Figure 14:
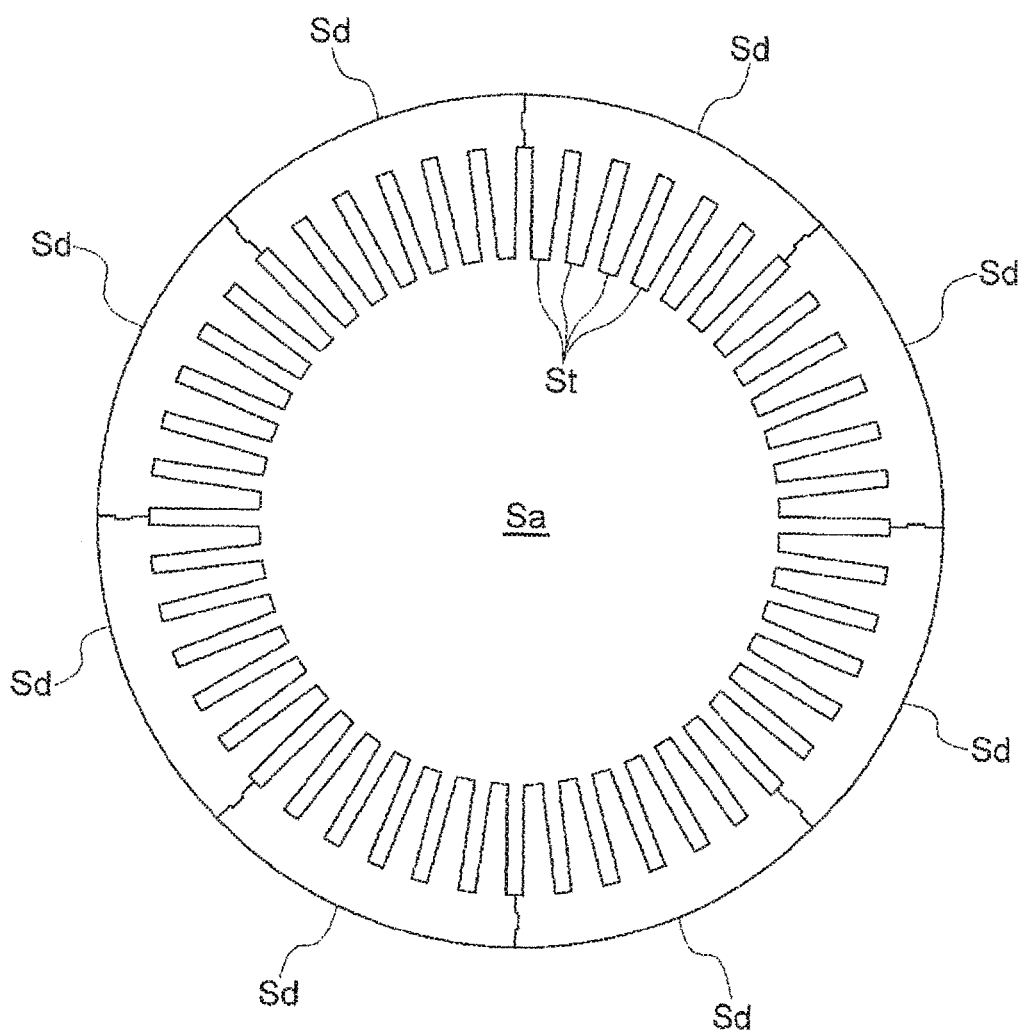
FIG. 14 is a plan view of a laminated core including eight core pieces each having six tooth parts.

In the above-described embodiments, cases have been exemplified in which one core piece Sd has one tooth part St, but one core piece Sd may have a plurality of tooth parts St. FIG. 14 is a plan view of a laminated core including eight core pieces Sd each having six tooth parts St.

Figure 15:
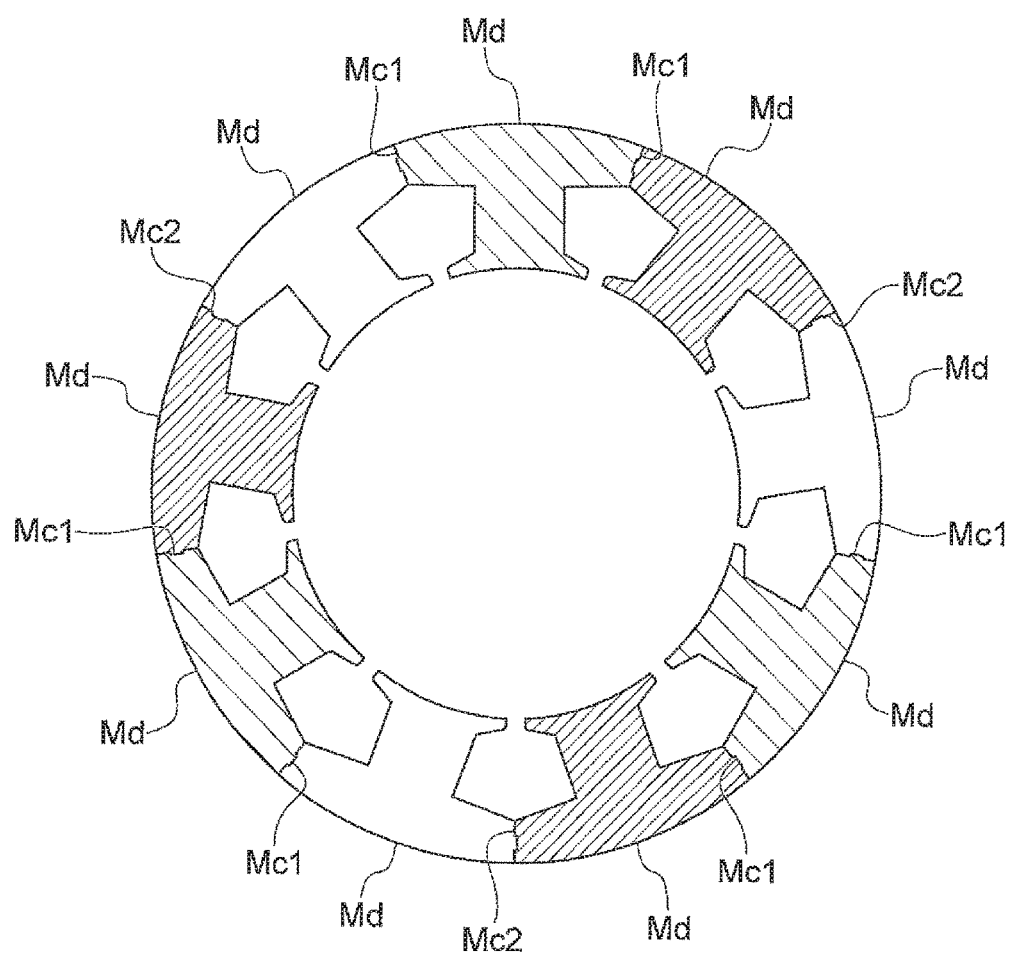
FIG. 15 is a plan view of a segmented workpiece including nine (an odd number of) pieces.

In the above-described embodiments, cases have been exemplified in which the workpiece MS including 12 (an even number of) pieces Md is produced, but the method according to this disclosure may be applied to production of a workpiece including an odd number of pieces Md. FIG. 15 is a plan view of a workpiece including nine pieces Md. To produce the workpiece depicted in FIG. 15, cutting-and-bending processing (or stamping) is first performed on three pieces Md indicated by coarse hatching among the nine pieces, whereby cutting lines Mc1 are formed on both sides of the respective three pieces Md. Then, cutting-and-bending processing (or stamping) is performed on three pieces Md (pieces indicated by dense hatching) adjacent to the coarsely hatched three pieces Md, whereby cutting lines Mc2 are formed on one side of each of the densely hatched three pieces Md. The workpiece including nine pieces Md can be obtained through these steps. In other words, when a workpiece including an odd number of pieces Md is to be produced, the segmented workpiece can be produced by performing cutting-and-bending processing or stamping on portions configured to be pieces Md sandwiching a plurality of portions configured to be pieces Md of a constant number depending on the number of the pieces Md.

In the above-described embodiments, cases have been exemplified in which the openings H1 or the openings H1' are formed to reduce abrasion of the punch before cutting-and-bending processing or stamping to form the cutting lines Mc, but the openings H1 and the openings H1' may not be necessarily formed.

In the above-described embodiments, cases have been exemplified in which the laminated core S that includes the tooth parts St extending from the inner periphery of the yoke part Sy toward the center is produced, but the method according to this disclosure may be applied to production of a laminated core (of an outer rotor type, for example) that includes tooth parts St extending outward.

Cases have been exemplified in which the bending lines Lb are formed radially outside the circumferential part My (see FIG. 6A), but the bending lines Lb may be formed radially inside the circumferential part My. In this case, a segmented workpiece can be produced through the following steps. That is, stamping at the outer circumference is first performed only on a piece Md to be subjected to cutting-and-bending processing to enable the overall piece Md to be subjected to cutting-and-bending processing to be displaced in the thickness direction of the sheet W. Then, the cutting lines Mc are formed by displacing the overall piece Md with the bending line Lb positioned radially inside being the fulcrum. After forming the cutting lines Mc by cutting-and-bending processing, the through hole Ma may be formed (stamping at the inner circumference), and the opening H3 may be formed (stamping at the outer circumference).

In the above-described embodiments, cases have been exemplified in which only the workpieces MS are stamped out of one sheet W, but both of the workpieces MS and the workpieces for a rotor may be stamped out of one sheet W. Furthermore, the workpieces may be stamped out of a plurality of stacked plates for processing W.

In a method disclosed in Japanese Patent No. 4472417, there is room for improvement in the following point. That is, when forming slit lines L by cutting-and-bending processing, this method also forms bending lines across a region configured to be a yoke part of a laminated core (see FIG. 7 in Japanese Patent No. 4472417). The method has the problem that a deformation or stress caused by cutting-and-bending processing is likely to remain in the yoke part even after pushing back the bent portions (part of the yoke part) after cutting-and-bending processing.

A plurality of embodiments of this disclosure has an object to provide a method for manufacturing a workpiece (hereinafter referred to as "segmented workpiece" in some cases) for a segmented laminated core sufficiently little affected by effects such as a deformation associated with the formation of cutting lines for segmenting the workpiece into a plurality of pieces. In addition, a plurality of embodiments of this disclosure has an object to provide a method for manufacturing a laminated core from a plurality of segmented workpieces produced by this manufacturing method.

One aspect of this disclosure relates to a method for manufacturing a segmented workpiece. This manufacturing method includes (A) feeding a plate for processing drawn from a roll thereof to a progressive die and (B) stamping out a workpiece in the progressive die, the workpiece including a plurality of pieces aligned in the circumferential direction with a circumferential part. At the above-described step (B), an overall portion configured to be each piece of the workpiece is displaced in a thickness direction of the plate for processing, with portions on both sides of the piece being fixed, to form at least one cutting line across a region configured to be the circumferential part.

In a plurality of embodiments of this disclosure, an overall portion configured to be a piece of the workpiece is displaced in the thickness direction of the plate for processing to form the cutting lines. Since the overall portion configured to be a piece of the workpiece is displaced, a deformation and the like associated with the formation of the cutting lines remaining in the piece can be sufficiently reduced.

When forming the cutting lines, the cutting lines may be formed by (1) cutting-and-bending processing or (2) stamping, as long as the overall portion configured to be the piece of the workpiece is displaced in the thickness direction of the plate for processing in the mode of the invention.

(1) When the Cutting Lines are Formed by Cutting-and-Bending Processing

Cutting-and-bending processing may form at least one cutting line and form a bending line radially outside or inside the circumferential part (see FIG. 6A). Since the bending line is formed radially outside or inside the circumferential part, a region on which the bending line is formed through a process of producing the workpiece can be excluded from the workpiece. Thus, the workpiece sufficiently little affected by effects such as a deformation associated with the formation of the cutting line for segmenting the workpiece into a plurality of pieces can be obtained.

(2) When the Cutting Lines are Formed by Stamping

Stamping may form at least one cutting line (see FIG. 11A). When the cutting line cannot be formed alone by stamping, part of the outer circumference or the inner circumference of the workpiece may be formed together with the cutting line. The overall portion configured to be the piece of the workpiece is displaced in the thickness direction of the plate for processing to form the cutting line, so that no bending line is formed on the piece. Thus, the workpiece sufficiently little affected by effects such as a deformation associated with the formation of the cutting line for segmenting the workpiece into a plurality of pieces can be obtained.

From a viewpoint of efficiently producing a segmented workpiece, the above-described step (B) may include, before forming the circumferential part of the workpiece by stamping out the workpiece at the outer circumference, (b-1) forming a through hole for the circumferential part and (b-2) forming the plurality of cutting lines radially extending on the circumferential part so that the workpiece will be segmented into a plurality of pieces aligned in the circumferential direction, in this order. The above-described step (B) may further include, after the above-described step (b-2), (b-3) returning the piece having been displaced in the thickness direction of the plate for processing to an original position. The piece having been displaced is returned to the original position by push-back in the progressive die, for example, thereby producing, with the progressive die, the workpiece in which the pieces aligned in the circumferential direction are connected.

A method for manufacturing a laminated core according to one aspect of this disclosure includes producing workpieces by the above-described manufacturing method and fastening the workpieces together to obtain a laminated core. The laminated core produced by the method includes the workpieces sufficiently little affected by effects such as a deformation and thus has sufficiently good magnetic properties. Any method for fastening the workpieces together is applicable. For example, the workpieces may be fastened to each other by swaging, welding, adhesive, or a resin material.

With a plurality of embodiments of this disclosure, a workpiece for a segmented laminated core sufficiently little affected by effects such as a deformation associated with the formation of cutting lines for segmenting the workpiece into a plurality of pieces can be obtained.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

What is claimed is:

1. A method for manufacturing a segmented workpiece, the method comprising:
    (A) feeding a plate for processing drawn from a roll thereof to a progressive die; and
    (B) stamping out a workpiece in the progressive die, the workpiece including a plurality of pieces aligned in a circumferential direction with a circumferential part, wherein the stamping comprises:
        forming a first cutting line and a second cutting line to define a first portion that is configured to become a piece of the plurality of pieces, the forming including:
            fixing, in a thickness direction, a second portion configured to become an adjacent piece of the plurality of pieces, and a third portion configured to become another adjacent piece of the plurality of pieces, the first portion being disposed between the second portion and the third portion in a circumferential direction, and
            displacing the first portion in the thickness direction while the second portion and the third portion remain fixed.

2. The method according to claim 1, wherein a bending line radially outside or radially inside the circumferential part and the two cutting lines are formed by cutting-and-bending processing.

3. The method according to claim 1, wherein the two cutting lines are formed by stamping.

4. The method according to claim 1, wherein the (B) includes, before forming the circumferential part by performing stamping at an outer circumference of the workpiece, the successive steps of:

(b-1) forming an inner opening radially inside the circumferential part; and (b-2) forming the two cutting lines on the region configured to be the circumferential part.

5. The method according to claim 4, further comprising:

(b-1a) forming an outer opening radially outside the inner opening.

6. The method according to claim 1, wherein the (B) includes the step of returning the piece having been displaced in the thickness direction of the plate for processing to an original position.

7. A method for manufacturing a laminated core, the method comprising the steps of:

producing workpieces by the method according to claim 1; and fastening the workpieces together to obtain a laminated core.

8. The method according to claim 1, wherein the two cutting lines are formed simultaneously by a single displacement, and the displacing is performed once for every two pieces that are formed.

* * * * *